March 5, 1968 W. R. HORTON 3,371,416
LEMON CLIPPER
Filed Jan. 21, 1966 3 Sheets-Sheet 1

WALTER R. HORTON, deceased,
by MARJORIE HELEN HORTON,
Administratrix
INVENTOR.

BY
Paul A. Weilein
ATTORNEY.

March 5, 1968     W. R. HORTON     3,371,416
LEMON CLIPPER

Filed Jan. 21, 1966     3 Sheets-Sheet 2

WALTER R. HORTON, deceased,
by MARJORIE HELEN HORTON,
Administratrix
INVENTOR.

BY Paul A. Weilein
ATTORNEY.

March 5, 1968  W. R. HORTON  3,371,416
LEMON CLIPPER
Filed Jan. 21, 1966  3 Sheets-Sheet 3
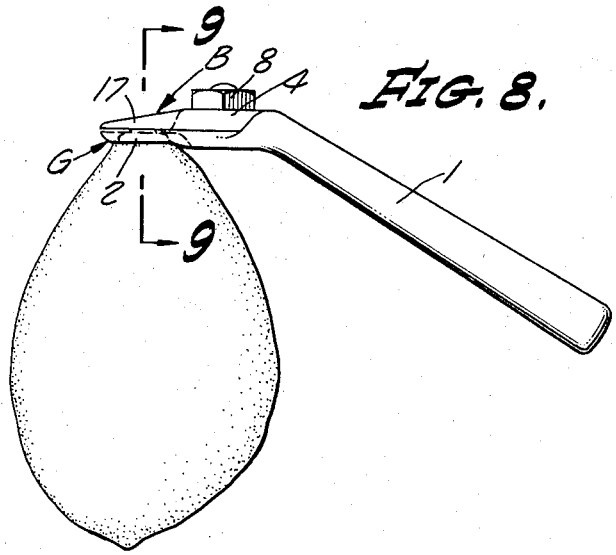
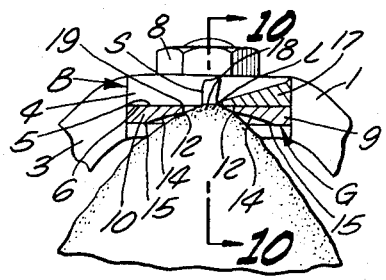
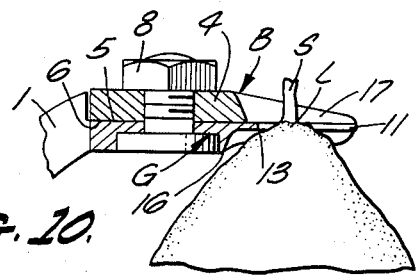
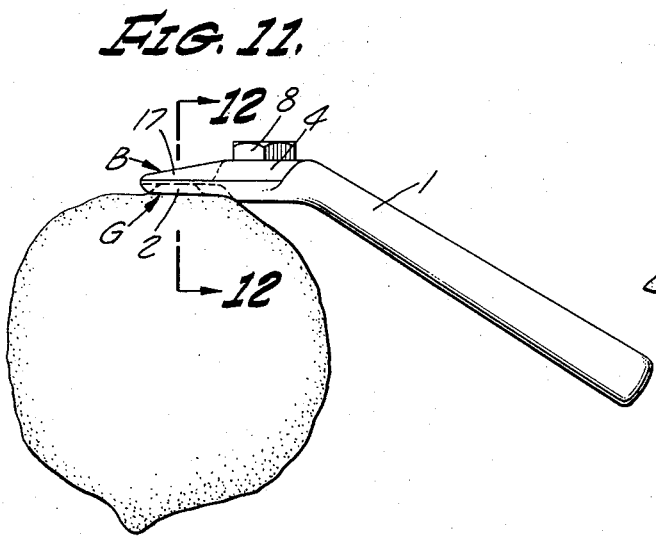
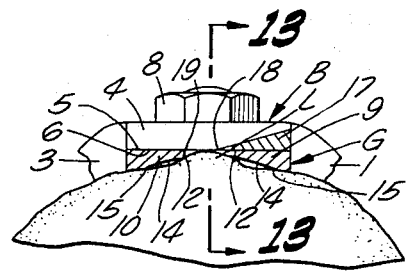
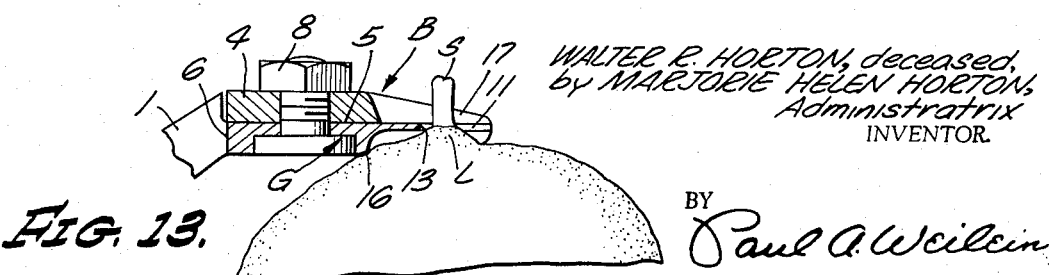
WALTER R. HORTON, deceased,
by MARJORIE HELEN HORTON,
Administratrix
INVENTOR.
BY Paul A. Weilein
ATTORNEY.

United States Patent Office 3,371,416
Patented Mar. 5, 1968

3,371,416
LEMON CLIPPER
Walter R. Horton, deceased, late of Ontario, Calif., by Marjorie Helen Horton, administratrix, Ontario, Calif., assignor to Sunkist Growers, Inc., Los Angeles, Calif., a corporation of California
Filed Jan. 21, 1966, Ser. No. 522,331
5 Claims. (Cl. 30—233)

ABSTRACT OF THE DISCLOSURE

The lemon clipper comprises a pair of pivotally connected complementary parts one of which has a gauge portion with a slot forming two gauge fingers with one of the fingers in the form of a first blade, the other complementary part having a second blade to cooperate with the first blade.

The slot of the gauge portion of the first complementary part forms a gauge edge of generally U-shaped configuration and the gauge portion is further cut away to form a gauge shoulder of generally U-shaped configuration symmetrically located relative to the U-shaped gauge edge, the gauge shoulder engaging lemons of globular shape to position the two blades for correctly severing the stems of the lemons.

---

The present invention relates to clippers and more particularly to clippers which have as their primary utility the severing of lemons from the stems by which the lemons are supported on a tree.

Various lemon clippers have been heretofore available which in the hands of skilled users have been found quite satisfactory from the standpoint of ease and speed of usage, and skilled users are able to pick lemons at a satisfactory rate using a double clip method involving first clipping the lemon from the tree with a substantial residual stem on the lemon, and then clipping off the residual stem close to the stem button.

Such prior clippers have also been satisfactory from the standpoint of severing the lemon from the stem by the second clip without severing the button at the juncture of the stem with the lemon, while at the same time shearing the stem on a plane which is close to a plane normal to the axis of the stem so as to avoid the formation of sharp corners or edges which would result from shearing of the stem on an angular plane. Both of the just mentioned factors in the removal of lemons from the stems are important from the standpoint of preservation of the lemons, inasmuch as the keeping quality of the lemon is adversely affected if the button is cut, thereby exposing the same to attack by fungus, and the angular clipping of the stem forms a sharp point on the residual stem of one lemon which has a tendency to penetrate the skin of an adjacent lemon when the same are packed, thereby exposing the adjacent lemon to fungus attack, moisture loss, etc.

In the absence of skilled labor capable of employing the prior lemon clippers in the desired fashion and with rapidity, the volume of lemons which may be clipped by the lemon pickers is either very small or the lemons are not severed from the stems in the desired manner as referred to above.

An object of the present invention is to provide lemon clippers which enable unskilled lemon pickers to attain a satisfactory volume of picked lemons having the stems satisfactorily removed. In accomplishing this objective the clippers of the invention provide structural features whereby the clippers assist the lemon picker in properly orienting the clippers relative to the lemon, notwithstanding substantial variation in the shape of the stem end of the lemon.

In the field, as lemons are removed from the lemon trees, the lemon picker typically may hold the lemon clippers of the invention in the palm of his hand, the clippers being supported by a strap adapted to extend about one or more of the lemon picker's fingers so that in substantially a continuous arcuate motion and without necessitating that the stem end of the lemon be visible to the picker, the picker will move his hand into engagement with the lemon, engage the clippers with the lemon stem adjacent the stem button, sever the lemon from the stem, and grip the severed lemon in his fingers so as to carry the same to a suitable receiver.

In order to assist the lemon picker in properly positioning the clippers relative to the lemon during the above mentioned substantially continuous movement and at the instant when the clippers are manipulated to sever the lemon, the present invention has as another and more specific objective the provision of clippers having means for contacting various portions of various shaped lemons so as to effectively gauge the positioning of the clippers relative to the lemon when the lemon is severed from its stem.

Still another object is to provide clippers according to the next preceding object in which the clippers are provided with gauge elements carried by one of the relatively movable components of the clippers which remains comparatively relatively immovable as the other clipper element is moved to effect a shearing of the lemon from the stem.

Yet another object of the invention is to provide lemon clippers which function as shears having one blade of the shears provided with gauging portions, said one blade also having additional gauging portions cooperative with the first mentioned gauging portions and variously engageable with the button at the stem end of the lemon, with the end of the lemon spaced from the stem button, or with the end of the lemon and with the button as may be required to assist in the positioning of the clippers on lemons of various shapes, the clippers also including a shearing blade which is movable relative to the gauge members to effect the shearing of the lemon from the stem.

Other objects and advantages of the invention will be hereinafter described or will become apparent to those skilled in the art, and the novel features of the invention will be defined in the appended claims.

Referring to the drawings:

FIG. 8 is a view in side elevation showing the clippers applied to another lemon of a different shape;

FIG. 9 is a fragmentary view in section as taken on the line 9—9 of FIG. 8;

FIG. 10 is a fragmentary view in section as taken on the line 10—10 of FIG. 9;

FIG. 11 is a view in side elevation illustrating the clippers applied to a lemon of another different shape;

FIG. 12 is a fragmentary view in section as taken on the line 12—12 of FIG. 11;

FIG. 13 is a fragmentary view in section as taken on the line 13—13 of FIG. 12;

Like reference characters in the several views of the drawings and in the following description designate corresponding parts.

The clippers hereof comprise a pair of complemental parts pivotally interconnected as is typical of clippers and shears in general. However, the present clippers are characterized by one of the complemental parts generally denoted at G being characterized as a gauge part and the other part generally denoted at B being characterized as a blade part for reasons which will hereinafter more fully appear.

Figure 5:
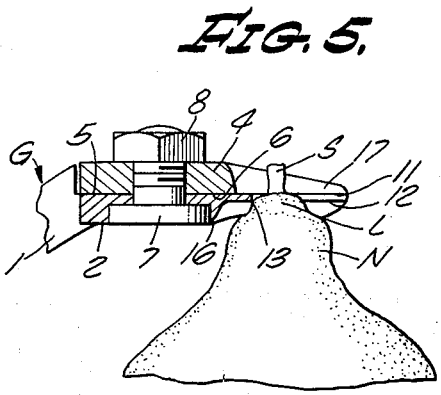
FIG. 5 is a fragmentary view showing the clippers in section on the line 5—5 of FIG. 4.
Figure 6:
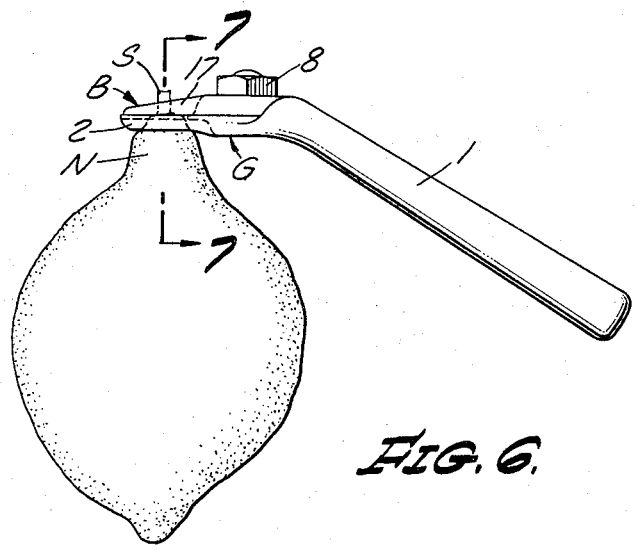
FIG. 6 is a side elevational view showing the clippers and lemon of FIG. 4.

The gauge part G comprises a lever or operating arm 1 having at one end a gauge section 2 extending at an obtuse angle from the operating arm 1. Similarly, the blade part B has a lever or operating arm 3 from which a blade section 4 projects at an obtuse angle. Referring to FIG. 5, it will be noted that the gauge end 2 of the gage part G is provided with a plane surface 5 on which the blade section 4 of the blade part B is slidably disposed, the blade section 4 having a corresponding plane surface 6 and the gauge end 2 and blade section 4 being interconnected for pivotal movement by pivot means in the form of a screw 7 and a nut 8. Accordingly, the assembly is one in which the blade section 4 will be pivoted relative to the gauge part 2 when the operating arms 1 and 3 are moved one relative to the other to effect a shearing action on the plane of surface 5 of the gauge part.

The gauge end 2 of gauge part G is provided with a pair of laterally spaced gauge fingers 9 and 10, there being a lemon stem receiving opening or slot 11 between the gauge fingers. Gauge fingers 9 and 10 are provided with mutually confronting edges 12 at opposite sides of the slot 11 which, as will hereinafter appear, constitute gauge edges spaced laterally of the gauge end 2. The inner limit of the slot 11 is formed by a wall which interconnects the opposite slot walls and this wall provides an edge 13 which also constitutes a gauge edge. These edges are formed at the juncture of opposing side walls of the gauge fingers 9 and 10 which are at opposite sides of the slot 11 and arcuately flared under surfaces 14, 14 of the gauge fingers 9 and 10. These undersurfaces 14, 14, at locations laterally spaced from the gauge edges 12, provide an additional pair of gauge edges or shoulders 15, 15. Extended between the gauge shoulders 15, 15 is a gauge edge or shoulder 16 which is spaced longitudinally of the shears inwardly from the gauge edge 13 referred to above as well as being spaced downwardly from the latter.

Figure 2:
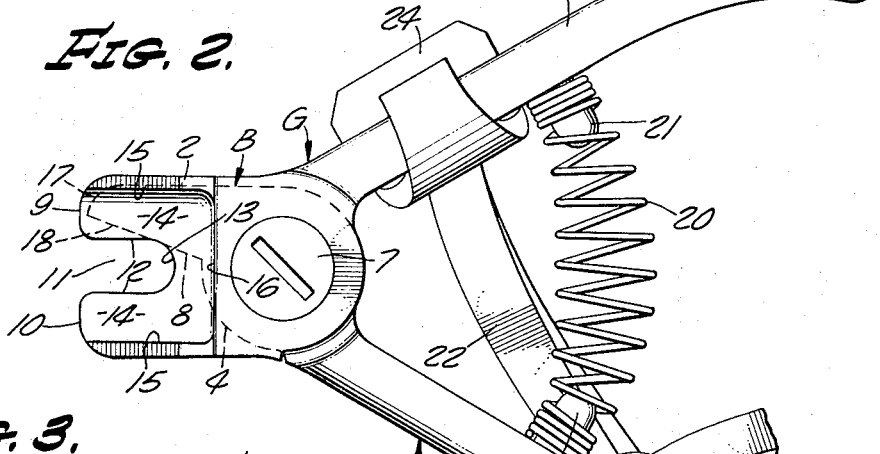
FIG. 2 is a bottom plan of the clippers of FIG. 1.
Figure 3:
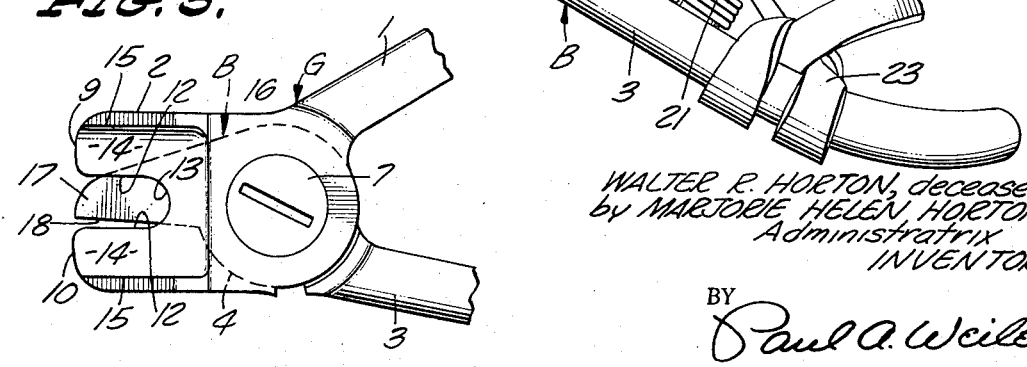
FIG. 3 is a fragmentary detail view also in bottom plan showing the shearing blade partially closed.
Figure 4:
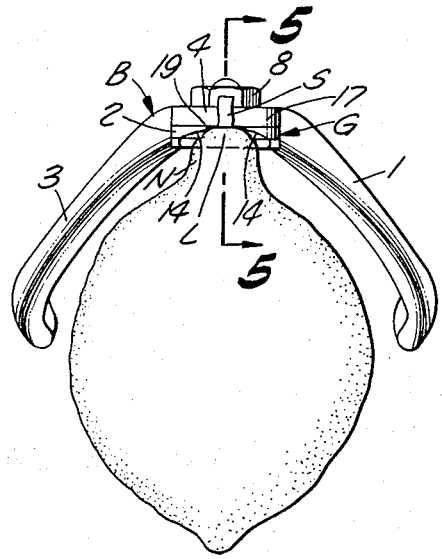
FIG. 4 is a view in front elevation showing the clippers engaged with a lemon.

The blade section 4 of the blade part B has a generally triangular shearing blade 17 provided with a cutting edge 18 which, when the shears are open as shown in FIG. 2, preferably is clear of the slot 11, but which, upon actuation of the shears, will slide over the planar surface 5 of gauge end 2 of the gauge part 1 to cooperate with a cutting edge 19 on the gauge finger 10 at the slot 11 to effect a shearing action.

Typical of clippers of the type here involved, the operating arms or levers 1 and 3 of the complemental parts G and B are normally spring biased to the condition shown in FIG. 2 and, accordingly, a coiled compression spring 20 is interposed between the operating arms 1 and 3 being supported on pins 21 formed as a part of the operating arms 1 and 3.

Figure 1:
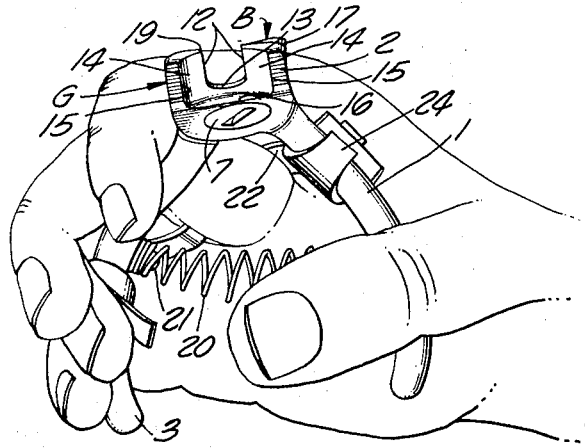
FIG. 1 is a view illustrating a lemon clipper made in accordance with the invention in the hand of a user.

Also typical of clippers of the type here involved, the operating arms 1 and 3 may be provided with a strap means 22 tied or otherwise suitably secured as at 23 to the operating arm 3 of blade section B toward its outer end and suitably secured to the operating arm 1 of gauge part G as at 24. The strap 22 provides a loop which, as shown in FIG. 1, extends about the outside of the second finger of a user's hand so that the clipper assembly will be supported within the grasp of the user's hand during use.

In this connection, while one of the prior practices in clipping lemons has involved first clipping the lemon from the tree at a location spaced from the stem end of the fruit and then subsequently making a second stem cut closely adjacent to the stem button, as will now be described, the gauge features of the present clippers facilitate usage of the present clippers by comparatively unskilled lemon pickers who may, with a single arcuate sweep of the hand, move the clippers into position with the lemon stem disposed in the slot 11, and the blade part B may be operated by the fingers to effect pivotal movement of the blade part, while the gauge part and more particularly the operating arm 1 thereof is held comparatively stationary against the heel of the palm or against the region of the hand at the juncture of the thumb and the heel of the palm so that, correspondingly, during the shearing action the gauge fingers 9 and 10 remain comparatively stationary as the blade 17 is moved across the slot 11 to effect the shearing action. At this time the lemon now severed from the stem is gripped between the fingers and thumb of the user, so as to be carried to a receiver at the end of the substantially continuous arcuate sweep of the user's hand.

As hereinabove mentioned, the use of gauge fingers and gauge edges assists in the positioning of the shears relative to the lemon even though the various lemons may have various stem end shapes so that the lemon picker need not be in a position that the stem end of the lemon is visible to him.

The gauge edges hereinabove described are adapted to engage the stem button, to engage the neck of the lemon spaced from the button, or to engage the body of the lemon spaced from the button, or combinations of such locations may be engaged by the gauge edges, depending upon the shape of the lemon.

Figure 7:
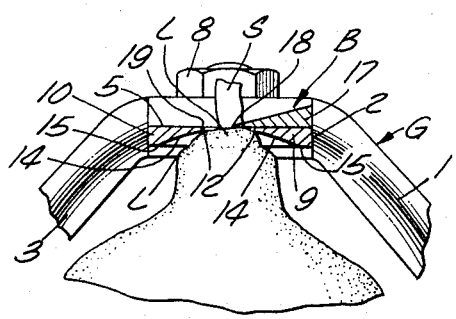
FIG. 7 is a fragmentary view in section as taken on the line 7—7 of FIG. 6.

Referring to FIGS. 4–7, the operation of the clippers has been illustrated in connection with the severing of a lemon having a long neck from a stem S at the juncture of the stem with the lemon button L, the gauging taking place on such button. As seen in FIG. 5, the gauge edge 13 at the inner extremity of the slot 11 engages the button L to limit movement of the stem into the slot. As seen in FIG. 7, the laterally spaced gauge edges 12 at opposite sides of the slot 11 also engage the lemon button L to limit the projection of the button into the space between the gauge edges 12, that is, into the slot 11. The spaced-apart engagement of gauge edges 12 on the arcuate button in combination with the contact of the gauge edge 13 also assists in positioning the clippers in a position such that the plane of the surface 5, which is effectively the shear plane of the shears, will be disposed normal to the axis of the stem. The thickness of the gauge fingers 9 and 10 at the slot 11, that is, the thickness of the slot walls from the gauge edges 12 to the surface 5 will determine the maximum residual stem length following the shearing of the lemon from the stem. Typically, as seen in FIG. 7 to best advantage, the button L is slightly arcuate or crowned at its outer extremity so that it is possible that the shearing edge 18 of the shearing blade 17 will shear the stem S precisely at the crown of the button L.

In FIGS. 8–10 the clippers hereof are illustrated in association with a lemon of a slightly different shape from that just described. The neck of the lemon is somewhat larger or broader so that the gauge action will occur by contact of the gauge edges with the lemon or, more particularly, the enlarged neck of the lemon as distinguished from the button. In FIG. 9 is will be observed that the gauge edges 12 engage the lemon at locations spaced from the button L while the gauge edge 13 at the inner end of slot 11 engages the lemon also in spaced relation to the button L. However, here again, as best seen in FIG. 9, inasmuch as the button is generally slightly crowned, the shear plate is substantially coincident with the crown of the button at the juncture with the stem S so that shearing will occur at the desired location without damage to the button and without leaving a residual projecting stem with which adjacent fruit may be damaged when the same are packaged.

In FIGS. 11–13 still another form of lemon is illustrated in which the lemon being more globular in shape than the lemons previously described is engaged by the gauge edges in still another fashion. Referring to FIG. 12, it will be noted that the gauge edges 12 are shown as contacting the button L, whereas in outwardly spaced relation from the edges 12, the gauge shoulders 15 also contact the body of the lemon. As seen in FIG. 13, gauge shoulder 16 also engages the lemon to assist in the proper positioning of the clippers so that the shear plane is not only normal to the axis of the stem S, but also the stem will be sheared substantially at the crown of the button.

Various other lemon shapes and changes of precise form of the same general shape may be encountered by the several gauge edges and shoulders provided in the structure described above, but it will now be apparent that the present clippers provide the spaced gauge edges and shoulders so arranged that the desired gauging action will occur upon engagement of the various gauge and shoulders with the surfaces of the predominance of the lemons ordinarily encountered. Therefore, the present lemon clippers substantially facilitate the clipping of lemons from the stems by unskilled labor at a reasonably rapid rate and in a satisfactory manner over a wide range of the encountered lemon sizes and shapes.

Figure 14:
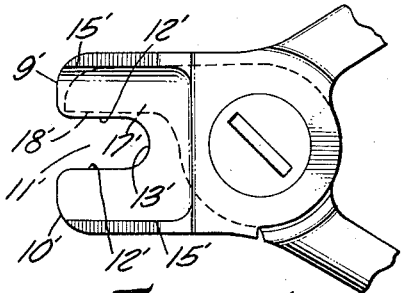
FIG. 14 is a fragmentary bottom plan of a modified clipper construction made in accordance with the invention.
Figure 15:
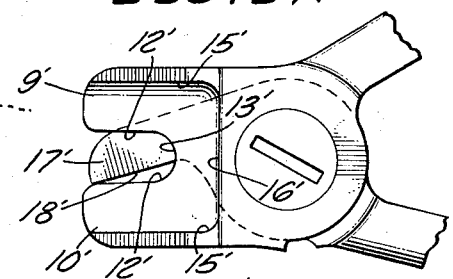
FIG. 15 is a view corresponding to FIG. 14 but illustrating the shearing blades partially closed.

Referring now to FIGS. 14 and 15 to which primed reference characters have been applied, a slightly modified construction is shown. In FIG. 14 it will be observed that the shearing edge 18' of the blade 17' is formed so that it extends generally parallel with the side wall of the slot 11' when the shears are open. Therefore, as the shears are closed and the blade 17' moves angularly, it will approach the cooperative shearing edge of the gauge finger 10' with a reverse angle shearing action having a tendency to pull the lemon stem inwardly of the slot as the shearing occurs, thus further assisting the user in properly engaging the lemon either with the gauge shoulder 15' at the inner end of the slot 11' or with the gauge shoulder 16' spaced further inwardly from the gauge shoulder 15'. Otherwise, the clippers of FIGS. 14 and 15 will function like those previously described insofar as the function of gauge edges 12' and gauge shoulders 15' is concerned.

While specific structural details have been shown and described, it should be understood that changes and alterations may be resorted to without departing from the spirit of the invention as defined in the appended claims.

I claim:
1. In a lemon clipper of the character described, the combination of:
   a pair of complementary parts;
   means pivotally connecting said complementary parts,
   one of said complementary parts having a handle portion and a gauge portion integral therewith, one face of said gauge portion being planar,
   said gauge portion having a slot extending to its outer end and forming a pair of gauge fingers,
   one of said fingers having a sharp edge along one side edge of the slot to form a first blade,
   the other of said complementary parts having a handle portion and a second blade integral therewith, the second blade lying against the planar face of said gauge portion to cooperate with said first blade,
   the other face of said gauge portion of said one part being formed with a pair of gauge shoulders on said gauge fingers respectively on opposite sides respectively of the slot and spaced laterally from the slot for engaging a lemon to position said two blades relative to the stem of the lemon for shearing the stem.

2. A lemon clipper as set forth in claim 1 in which said gauge fingers taper in cross section from said gauge shoulders to the corresponding side edges of the slot.

3. A lemon clipper as set forth in claim 1 in which the tapered sides of the gauge fingers are of concave cross sectional configuration.

4. A lemon clipper as set forth in claim 1 in which said slot between the two gauge fingers has a gauge edge of generally U-shaped configuration,
   and which includes a third gauge shoulder forming with said pair of gauge shoulders a generally U-shaped gauge shoulder positioned substantially symmetrically of the U-shaped gauge edge.

5. A lemon clipper as set forth in claim 1 in which the opposite edges of said slot are substantially parallel and said gauge shoulders are substantially parallel with the opposite edges of the slot.

References Cited

UNITED STATES PATENTS

| 476,279 | 6/1892 | Levin | 30—258 |
| 776,828 | 12/1904 | Earnhart | 30—233 |
| 836,388 | 11/1906 | Kyle | 30—233 |
| 886,555 | 5/1908 | Tuttle | 30—233 |
| 1,066,925 | 7/1913 | Lancaster | 30—233 |
| 1,287,637 | 12/1918 | Cobb | 30—233 |

OTHELL M. SIMPSON, *Primary Examiner.*

WILLIAM FELDMAN, *Examiner.*

J. C. PETERS, *Assistant Examiner.*